(No Model.)  2 Sheets—Sheet 1.

M. A. McCLELLAND.
EDUCATIONAL APPARATUS.

No. 574,815. Patented Jan. 5, 1897.

Witnesses:
Joseph H. Milans.
Harry Sisson.

Inventor:
Mary A. McClelland
By J. S. Barker,
Atty.

(No Model.)  M. A. McCLELLAND.  2 Sheets—Sheet 2.
EDUCATIONAL APPARATUS.
No. 574,815.  Patented Jan. 5, 1897.
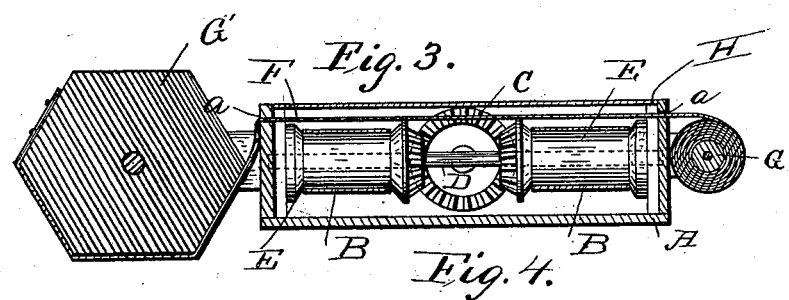
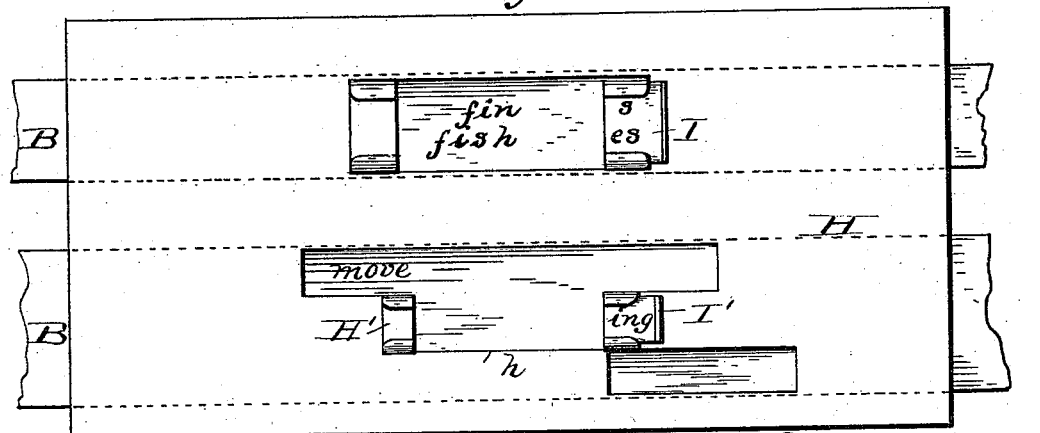
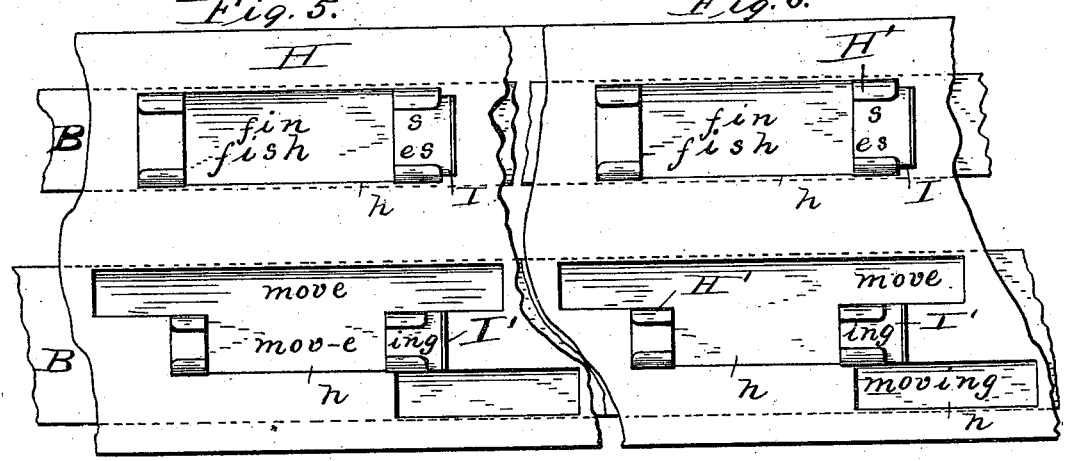
Witnesses;
Joseph H. Milans.
Harry Sisson.
Inventor;
Mary A. McClelland
By J. S. Barker
Att'y.

UNITED STATES PATENT OFFICE.

MARY A. McCLELLAND, OF ALBANY, NEW YORK.

EDUCATIONAL APPARATUS.

SPECIFICATION forming part of Letters Patent No. 574,815, dated January 5, 1897.

Application filed April 18, 1896. Serial No. 588,099. (No model.)

*To all whom it may concern:*

Be it known that I, MARY A. MCCLELLAND, a citizen of the United States, residing at Albany, in the county of Albany and State of New York, have invented certain new and useful Improvements in Educational Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has for its object to improve the educational device for which I obtained Letters Patent No. 531,957, dated January 1, 1895, whereby its capabilities are largely increased and there is produced an apparatus especially useful in teaching the primary grades.

Figure 1:
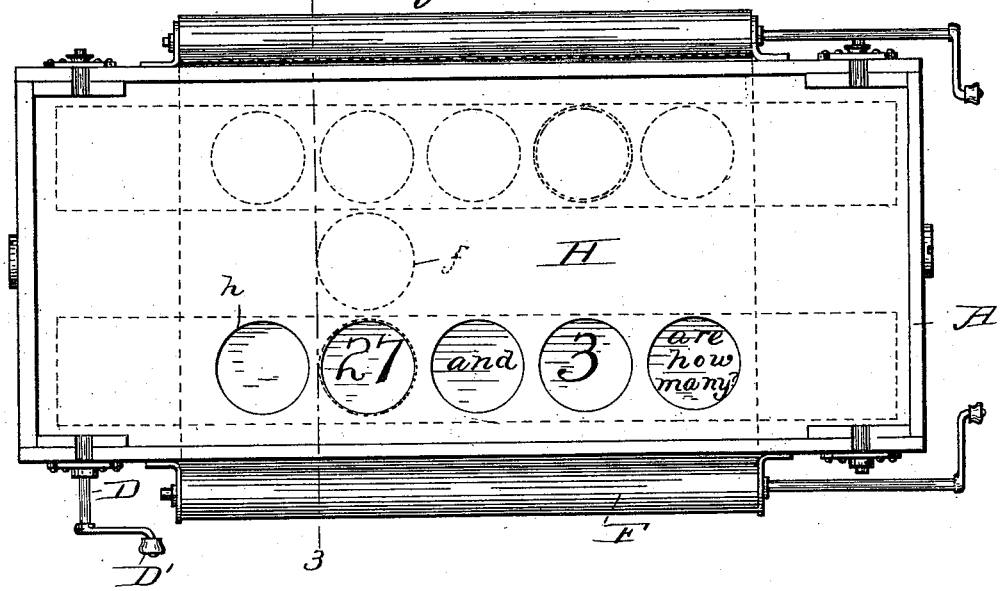
Figure 2:
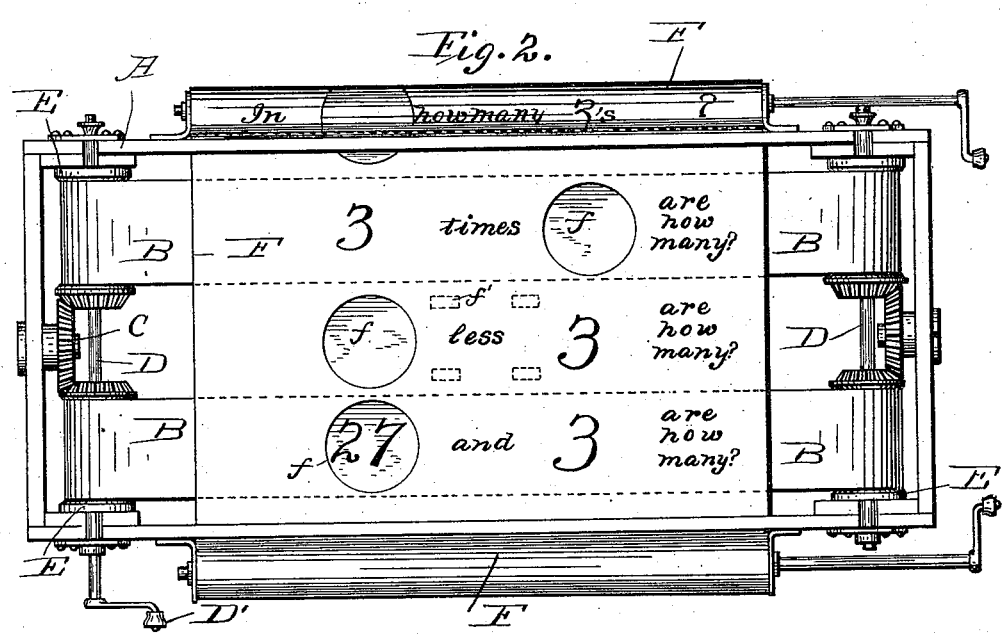

Figure 1 is an elevation of an apparatus made according to my invention and arranged for teaching arithmetic. Fig. 2 is a similar view with the cover-plate removed. Fig. 3 is a cross-section taken on the line 3 3 of Fig. 1, showing one of the rollers for the transverse band to be polygonal. Fig. 4 is a detached view of one form of cover-plate, especially designed for grammar work and spelling. Figs. 5 and 6 are detail views illustrating one method of using the apparatus.

In the said drawings, A represents the case, which is preferably a comparatively shallow oblong box. In this are mounted, side by side, two longitudinally-arranged narrow belts or bands B and mechanism C for moving them, which may be like that shown in my aforesaid patent. The bands are supported on spools E, which are mounted on shafts D, one of which is extended through the side of the case and provided with an operative handle D'.

F represents a band or curtain, which is arranged over the two narrow bands B and is so mounted as to be movable transversely or in a direction at right angles to the movements of the bands B. This band is relatively wide, covering, preferably, nearly the whole extent of the bands B between the spools E, and is mounted upon rollers G, suitably supported by the case. These rollers may be upon the outside of the case, and they are so represented in the drawings, and when so arranged the band or curtain F passes through narrow slits or openings $a$ in the sides of the case. This band has a series of openings $f$ through it, whereby, as the band is moved into different positions, the longitudinal bands B are more or less exposed to suit the particular work to which the apparatus is being put.

The openings may be all alike in shape, as represented in Fig. 2, or they may differ one from the other in shape, depending upon the kind of work to which the apparatus is put. Upon this band there may be placed printed matter arranged adjacent to the openings $f$, so that the printed matter upon the band or bands B, which appears through the opening or openings $f$, may be read in connection with the printed matter upon the band F, as will be hereinafter explained.

H designates a removable cover for the open side of the case, made so as to be easily applied and secured in place and easily removed to be replaced by another cover. This cover is formed with openings $h$ through it and is arranged directly over the bands B and F. The arrangement of the openings $h$ is varied to suit the particular kind of work for which the apparatus is to be used, and they may be arranged opposite to both or to but one of the bands B. With each apparatus there are usually supplied a number of these cover-plates H, as well as a number of sets of bands B and F.

In Fig. 4 there is shown a cover-plate which is provided with card-holders H', arranged adjacent to the openings $h$, in which may be placed cards bearing printed matter, such as a prefix or suffix which is to be added to a series of root-words that are made to appear through the openings by movements of the bands. In like manner the band F may be provided with card-holders arranged adjacent to the openings $f$, (represented in dotted lines at $f'$, Fig. 2,) and in these holders may be arranged interchangeable cards or strips of paper upon which any desired matter may be printed to be read in connection with the matter upon the bands B, which appears through the openings $f$. This arrangement may be used in lieu of that shown in Fig. 2, where the printed matter is directly upon the band itself. Each arrangement has certain advantages.

In Figs. 1 and 2 the apparatus is represented as being adapted for the teaching of arithmetic. Upon the bands B there are series of numbers. The openings $f$ through the band or curtain F are circular and of a size to expose only a single number through each one. The band F also carries certain written or printed matter which, when read in connection with the number upon the band B which appears through the opening $f$, which is in line with or adjacent to such printed matter, states a problem which is to be solved by the scholar. Thus in Fig. 2 the number "27" upon the lower band B appears through an opening in the band F and the words "and 3 are how many?" are printed upon the band to the right of the opening, so the problem which is shown is "27 and 3 are how many?" The part of the band F which is over the space between the two bands B has an opening $f$, following which are the words "less 3 are how many?" so that when the band is moved to bring this opening over a number upon one of the bands B a problem in subtraction will be stated. The part of the transverse band or curtain which is shown over the upper band B has an opening $f$, which is arranged farther to the right than are the openings which have been referred to, and before or to the left of this opening are the words "3 times," and following it the words "are how many?" The problem shown is one in multiplication. In place of words arithmetical signs are sometimes used in stating the problems. In using the apparatus when arranged as just described for arithmetic work the bands B and F are shifted from one position to another, by means of which many problems can be shown for solution, and the interest which is excited by the manipulation of the apparatus holds the attention of the scholar and stimulates the mind to activity and concentration.

It will be understood that instead of printing the words and signs directly upon the band F they may be printed upon cards or strips of paper which may be suitably secured to the band.

In using the apparatus a cover-plate H is employed, so that the movable parts of the apparatus are covered and hid, except as they are exposed through the openings $h$ in such plate, these openings being so disposed as to show the printed or written matter which states the problems to be solved. The advantage of this is that the eye and mind are not diverted from the lesson being taught by the moving parts of the apparatus. There may be two sets of openings formed in the cover-plate, one for each band B, but ordinarily it is found best to have but one set when using the apparatus for arithmetic work, as just described, the cover being turned end for end when a change is made from one band to the other.

Lessons in word-making, grammar, and in other branches of study may be taught by the aid of this apparatus, in which case words or phrases or sentences will be carried by the bands B instead of numbers.

In Fig. 4 is shown a cover or screen for the bands B, the openings in which are especially arranged for showing different forms of the same word. The upper opening is a simple oblong hole at either end of which are arranged the card-holders H'. A card I is shown in the holder at the right-hand end of the opening, upon which appear the two common plural endings of English words—viz., "s" and "es." Upon the band B are words in their singular form, which, when brought close to the card I, are changed into their plural forms by the plural endings upon the card.

It will be understood that the opening $h$ is sufficiently long to permit the words to appear sufficiently far to the left of the card I to be easily read in their singular form before they are moved up close to the cards to have their terminal letters added. In the holder at the left of the opening may be placed cards bearing prefixes to be applied to root-words which are on the longitudinal band.

The lower opening in Fig. 4 is of irregular shape, designed to demonstrate the modification of the form of a root-word when a syllable is added. For example, take the word "move," the final "e" of which is dropped when the syllable "ing" is added. This I demonstrate by placing a card bearing the suffix "ing" in a holder arranged between two portions of the opening in the screen or cover and by placing upon the band B the root-word on one line, the root modified by dropping the "e" in another line, and the derivative word in a third line and preferably directly below the root-word. The shape of the opening $h$ and the arrangement of the words upon the band B are such that as the band is moved toward the right the root-word first appears through the opening $h$, Fig. 4. A further movement of the band, Fig. 5, brings the modified root-word "mov-e" opposite the syllable "ing" on the card I', the root "move" being still in view. A still further movement of the band, Fig. 6, carries the modified root-word out of sight and brings into view the derivative word "moving," which is directly below the word "move," but separated therefrom by that part of the cover which bears the suffix syllable.

I do not deem it necessary to further illustrate the uses to which my invention may be put, as sufficient has been shown to demonstrate its wide scope of adaptability.

It will have been observed that both the band F and the cover-plate H serve as screens or covers to hide in part the bands B, and that for some kinds of work, as that last described, either one may be used without the other. When the band F is being used with openings such as last described, it is best, however, to employ a cover-plate H, the opening or openings in which will be of such size as to expose sufficient of the band F to permit any demonstration which may be made to be easily seen, while the other parts of the apparatus are hid.

One or both of the supporting-rollers for the transverse band may be polygonal in cross-section, and in Fig. 3 the roller G' is shown as being hexagonal. An advantage of this construction is that when the flat faces of the roller are of a width equal to the distance between lines passing through the centers of the openings $f$ in the transverse band the operator can be certain that the band F has been moved exactly the proper distance to cause the openings $f$ to be directly over the bands B without inspecting the apparatus, provided the roller be turned the distance of one of its faces, or, in this instance, one-sixth of a revolution.

Having described my invention, what I claim is—

1. In an educational apparatus, the combination of a longitudinally-arranged band by which may be carried words, numbers, &c., a transversely-arranged, movable perforated band over the longitudinal band, and a perforated cover arranged over the last-mentioned band, certain of the perforations in such cover being arranged to be over unperforated parts of the transverse band, substantially as set forth.

2. In an educational apparatus, the combination of a longitudinally-arranged band upon which may be placed words, numbers, &c., and a broad, transversely-arranged movable band situated over the first-mentioned band, and formed with a series of openings, and with written or printed matter adjacent to such openings, whereby such printed matter may be read in connection with the matter upon the longitudinal band appearing through said openings, substantially as set forth.

3. In an educational apparatus, the combination of a pair of narrow longitudinally-arranged bands, B, mechanism for moving them, a broad, transversely-arranged, movable band F, provided with a series of perforations, and a removable and replaceable perforated cover-plate H, substantially as set forth.

4. In an educational apparatus, the combination of a movable band upon which may be placed words, numbers, &c., and a perforated screen arranged over such band and provided with card-holders situated adjacent to the perforations in the screen and adapted to contain cards upon which is printed matter to be read in connection with the printed matter on the movable band, substantially as set forth.

5. The combination, with a supporting-case, of a pair of narrow movable bands arranged therein, a broad band movable transversely over the said narrow bands, and provided with openings through which the lower bands may be seen, and with printed matter upon it, and a cover-plate having openings disposed so as to expose the parts of the said bands which it is desired should be seen, substantially as set forth.

MARY A. McCLELLAND.

Witnesses:
 RUFUS W. KIMBALL,
 HENRY V. LONG,
 WHEELER B. MELIUS.